United States Patent
Isoda et al.

(10) Patent No.: US 10,883,558 B2
(45) Date of Patent: Jan. 5, 2021

(54) ROTARY INERTIAL MASS DAMPER

(71) Applicant: Shimizu Corporation, Tokyo (JP)

(72) Inventors: Kazuhiko Isoda, Tokyo (JP); Yasuhiro Yamamoto, Tokyo (JP)

(73) Assignee: SHIMIZU CORPORATION, Tokyo (JP)

( * ) Notice: Subject to any disclaimer, the term of this patent is extended or adjusted under 35 U.S.C. 154(b) by 0 days.

(21) Appl. No.: 15/667,824

(22) Filed: Aug. 3, 2017

(65) Prior Publication Data

US 2017/0328436 A1    Nov. 16, 2017

Related U.S. Application Data

(63) Continuation of application No. PCT/JP2016/053989, filed on Feb. 10, 2016.

(30) Foreign Application Priority Data

Feb. 12, 2015    (JP) .................................. 2015-025320

(51) Int. Cl.
| | |
|---|---|
| *F16F 9/20* | (2006.01) |
| *F16F 9/49* | (2006.01) |
| *F16F 9/12* | (2006.01) |
| *F16F 7/10* | (2006.01) |
| *F16F 15/023* | (2006.01) |

(52) U.S. Cl.
CPC .............. *F16F 9/20* (2013.01); *F16F 7/1022* (2013.01); *F16F 9/12* (2013.01); *F16F 9/49* (2013.01); *F16F 15/023* (2013.01)

(58) Field of Classification Search
CPC .... F16F 9/504; F16F 9/34; F16F 9/466; F16F 9/342; F16F 9/20; F16F 15/12366; F16F 15/161; F16F 15/02; F16F 9/32; F16D 3/12; F16D 15/16; F15B 15/18; B60G 17/018;
(Continued)

(56) References Cited

U.S. PATENT DOCUMENTS 2,777,544 A * 1/1957 O'Connor ................. F16F 5/00
                                                188/275
2,986,005 A * 5/1961 Dudley .................... F02C 7/272
                                                60/626
(Continued)

FOREIGN PATENT DOCUMENTS

| CN | 101709760 A | 5/2010 |
| CN | 103534111 A | 1/2014 |

(Continued)

OTHER PUBLICATIONS

International Search Report for PCT/JP2016/053989 dated Apr. 12, 2016.
(Continued)

*Primary Examiner* — Bradley T King
*Assistant Examiner* — Mahbubur Rashid
(74) *Attorney, Agent, or Firm* — Hoffmann and Baron, LLP (57)    ABSTRACT

The rotary inertial mass damper has a configuration in which the rotary shaft of the oil-pressure motor rotates due to oil pressure of operating oil that is extruded from an oil chamber through reciprocating movement of the piston rod, and viscosity resistance is produced in operating oil that circulates in the connection pipes.

7 Claims, 3 Drawing Sheets

(58) Field of Classification Search
CPC . B60G 17/0152; B60G 17/016; B60G 17/019
USPC .......................................................... 188/275
See application file for complete search history.

(56) References Cited

U.S. PATENT DOCUMENTS

| | | | | |
|---|---|---|---|---|
| 3,142,230 | A * | 7/1964 | Bidlack | F15B 9/12 91/422 |
| 3,477,665 | A * | 11/1969 | Legrand | B64C 27/001 188/266.2 |
| 3,836,098 | A * | 9/1974 | Miyashita | B64C 27/001 188/380 |
| 4,145,959 | A * | 3/1979 | Burden | F15B 11/076 137/504 |
| 4,649,803 | A * | 3/1987 | Abel | F15B 9/03 137/596.17 |
| 4,655,440 | A * | 4/1987 | Eckert | B60G 17/0152 188/266.5 |
| 4,926,985 | A * | 5/1990 | Mizuno | F16F 9/532 188/267.1 |
| 4,973,854 | A * | 11/1990 | Hummel | B60G 15/12 137/529 |
| 5,117,633 | A * | 6/1992 | Bayer | F15B 11/0725 251/59 |
| 5,139,119 | A * | 8/1992 | Karnopp | B60G 17/08 137/503 |
| 5,140,203 | A * | 8/1992 | Reder | H01F 7/088 310/183 |
| 5,222,759 | A * | 6/1993 | Wanner | B60G 17/04 280/124.158 |
| 5,337,864 | A * | 8/1994 | Sjostrom | B60G 13/18 188/266.2 |
| 6,352,143 | B1 | 3/2002 | Niaura et al. | |
| 7,314,124 | B2 * | 1/2008 | Martyn | F16F 5/00 188/312 |
| 8,499,907 | B2 * | 8/2013 | Smith | B60G 13/14 290/1 R |
| 8,820,064 | B2 * | 9/2014 | Six | B60G 17/056 60/414 |
| 9,422,998 | B2 * | 8/2016 | Ogawa | F16F 9/48 |
| 2001/0033047 | A1 * | 10/2001 | Beck | F16F 9/064 267/64.16 |
| 2003/0146343 | A1 * | 8/2003 | Zoppitelli | B64C 27/35 244/17.11 |
| 2004/0233161 | A1 * | 11/2004 | Shahoian | G06F 3/016 345/156 |
| 2005/0016089 | A1 * | 1/2005 | Kohuthek | A47K 17/00 52/177 |
| 2010/0072760 | A1 * | 3/2010 | Anderson | B60G 13/14 290/1 R |
| 2013/0037362 | A1 * | 2/2013 | Gartner | F16F 7/1034 188/378 |
| 2015/0093245 | A1 * | 4/2015 | Fuhrer | F16F 9/064 267/64.16 |
| 2016/0280363 | A1 * | 9/2016 | Heverly, II | B64C 27/001 |

FOREIGN PATENT DOCUMENTS

| | | | |
|---|---|---|---|
| CN | 103534111 A | 2/2014 | |
| CN | 104343878 A | 2/2015 | |
| JP | A57171132 | 10/1982 | |
| JP | A-58-024634 A | 2/1983 | |
| JP | A59187124 | 10/1984 | |
| JP | UA60059838 | 4/1985 | |
| JP | A2002502942 | 1/2002 | |
| JP | A2003526059 | 9/2003 | |
| JP | A2004537009 | 12/2004 | |
| JP | A-2007-205433 A | 8/2007 | |
| JP | A2008196606 | 8/2008 | |
| JP | A2014052066 | 3/2014 | |
| WO | WO9922162 | 5/1999 | |
| WO | WO 01/66969 A1 | 9/2001 | |
| WO | WO03005142 | 1/2003 | |
| WO | WO-2011089373 A1 * | 7/2011 | B06G 13/16 |

OTHER PUBLICATIONS

Chinese Office Action Application No. 201680008890.8 dated Nov. 6, 2018.
Chinese Office Action Application No. 20168000880.8 dated Nov. 6, 2018.
Japanese Office Action Notification (information statement) Application No. 2015-025320 dated Feb. 26, 2019.

* cited by examiner

ROTARY INERTIAL MASS DAMPER

This application is a continuation application based on a PCT Patent Application No. PCT/JP2016/053989 filed on Feb. 10, 2016, whose priority is claimed on Japanese Patent Application No. 2015-025320, filed in Japan on Feb. 12, 2015. The contents of both the PCT Application and the Japanese Application are incorporated herein by reference.

BACKGROUND OF THE INVENTION

Field of the Invention

The present invention relates to a rotary inertial mass damper for reducing relative vibration generated between two members in an approaching or separating direction.

Description of Related Art

In the related art, as a rotary inertial mass damper, for example, as disclosed in Japanese Unexamined Patent Application, First Publication No. 2008-196606, there is known a device that generates a reaction force proportional to relative acceleration of both ends of a damper and is configured to achieve an effect of inertial mass thousands of times a weight by using a ball screw mechanism.

A rotary inertial mass damper using the ball screw mechanism disclosed in Japanese Unexamined Patent Application, First Publication No. 2008-196606 is configured to include a ball screw that has an outer circumferential surface, on which a screw is formed, and that is disposed in a state of penetrating one member of two members, a rotary weight that is fixed to a front end portion of the ball screw so as to be rotatable along with the ball screw on an outer side of the one member, a ball nut that is screwed to an intermediate portion of the ball screw so as to be relatively displaceable in an axial direction of the ball screw and is fixed to the one member, and a support unit that supports a base end portion of the ball screw in a freely rotatable manner and an undisplaceable manner in the axial direction and is fixed to the other member.

In addition, as a rotary inertial mass damper having another configuration of the damper using the ball screw described above, for example, Japanese Unexamined Patent Application, First Publication No. 2014-52066 discloses a damper that converts the linear motion into the rotary motion by an oil-pressure mechanism configured to have a cylinder and a piston such that a rotary weight is caused to rotate. Japanese Unexamined Patent Application, First Publication No. 2014-52066 discloses a vibration damping device that is configured to include a rotary weight which has a rotary vane provided in a channel bypassing a pair of oil chambers formed by partitioning the inside of the cylinder with the piston, and in which the rotary vane is inscribed, and that achieves an inertial mass effect by the rotary weight by using a mechanism that converts the linear motion of the piston into the rotary motion of the rotary vane.

However, the rotary inertial mass damper in the related art has the following problems.

In other words, in the rotary inertial mass damper disclosed in Japanese Unexamined Patent Application, First Publication No. 2008-196606, the ball screw, the ball nut, and a bearing are known to convert the displacement (linear motion) of the damper in the axial direction into the rotary motion; however, the ball screw mechanism using the expensive ball screws, ball nuts, and the like is a core component that accounts for most of the costs of the damper, and thus a reduction in the costs has been demanded.

In addition, in a case of a structure using the oil-pressure mechanism disclosed in Japanese Unexamined Patent Application, First Publication No. 2014-52066, operating oil is likely to pass through a gap of the rotary vane at the time of a low speed, as a result, the rotary vane does not rotate, and thus the rotary weight does not rotate. Therefore, there is a concern that a sufficient inertial mass effect will not be achieved.

The present invention is made in consideration of the problems described above, and an object thereof is to provide a rotary inertial mass damper that is capable of exhibiting stable damper performance at low costs from a low speed to a high speed.

SUMMARY OF THE INVENTION

In order to solve the problems described above and achieve such an object, the present invention employs the following aspect.

(1) According to an aspect of the present invention, there is provided a rotary inertial mass damper that is interposed between two members which are relatively displaced in a direction in which the members approach or are separated from each other, and that generates a force due to relative acceleration in an approaching or separating direction which is generated between the two members, the rotary inertial mass damper including: a cylinder which is connected to one of the two members and in which an operating fluid is sealed; a piston rod which is connected to the other of the two members and a part of which is accommodated in the cylinder in a freely reciprocating manner; a piston which is provided on the piston rod and partitions the cylinder into two fluid chambers; a fluid-pressure motor which has a rotary shaft connected to each of the two fluid chambers via connection pipes; a damping valve that exhibits a damping force by an operating fluid; and a rotary weight which is integrally provided on the rotary shaft of the fluid-pressure motor. The rotary shaft of the fluid-pressure motor rotates due to the fluid pressure of an operating fluid that is extruded from one of the fluid chambers through reciprocating movement of the piston rod.

According to the rotary inertial mass damper in a member of a structure described above, when the relative vibration is generated between the two members in the direction of approaching or separating, and the piston rod performs the reciprocating movement in the cylinder in a direction along a piston axis, the operating fluid flows into the connection pipes that connect the fluid chambers in the cylinder and the fluid-pressure motor such that the rotary shaft of the fluid-pressure motor rotates. In this manner, the rotary weight rotates around the rotary shaft, and inertial mass is applied by the rotary weight. At this time, since viscosity resistance is produced in the operating fluid that passes through the damping valve, it is possible to produce damping proportional to a displacement amount of the piston in the direction along the piston axis by the damping valve, that is, the speed of the operating fluid that flows through the connection pipe.

As described above, in the present invention, the fluid-pressure motor and an oil damper in the related art that is configured to include a cylinder and a piston rod are combined, and thereby it is possible to configure the rotary inertial mass damper. Therefore, there is no need to provide expensive ball screws or bearings, and thus it is possible to achieve a reduction in cost.

In addition, in this case, the damping valve is provided, thereby making it possible to apply the damping in parallel with the inertial mass. Therefore, adjustment of the damping valve enables an arbitrary damping coefficient to be applied, and it is possible to set the optimum damping to reduce the response.

In addition, in the rotary inertial mass damper described above, since a frame has rigidity, similar to a common oil damper, any portions that configure the rotary inertial mass damper can return to original positions after an earthquake. Therefore, also in a case where a plurality of earthquakes such as aftershocks following a major earthquake occur, it is possible to maintain initial performance without a drift of the piston rod in the rotary inertial mass damper in a specific direction. In addition, unlike a damper in the related art that uses a ball screw, it is possible to employ a configuration that can stably exhibit damper performance without a reduction in stroke of the ball screw due to residual deformation.

(2) In the rotary inertial mass damper according to (1) above, the damping valve may be provided, on each of the connection pipes, and viscosity resistance may be produced in an operating fluid that circulates through the connection pipe by the damping valve.

In this case, the damping valve is provided at a position on the connection pipe that connects the fluid chambers of the cylinder and the fluid-pressure motor, thereby making it possible to apply the damping in parallel with the inertial mass. Therefore, the adjustment of the damping valve enables an arbitrary damping coefficient to be applied, and it is possible to set the optimum damping to reduce the response.

(3) The rotary inertial mass damper according to (1) above may further include a bypass pipe that connects a pair of the damping valves. When an operating fluid flows at a speed equal to or higher than a certain speed in one of the connection pipes, the operating fluid in the one connection pipe may be circulated toward the other connection pipe through the bypass pipe.

(4) The rotary inertial mass damper according to (2) above may further include a bypass pipe that connects a pair of the damping valves. When an operating fluid flows at a speed equal to or higher than a certain speed in one of the connection pipes, the operating fluid in the one connection pipe may be circulated toward the other connection pipe through the bypass pipe.

In this case, in a case where the operating fluid passes through the connection pipe at an excessive speed equal to or higher than a certain speed, for example, the damping valve is largely opened, and thereby it is possible for a part of the operating fluid to flow into the bypass pipe. In this manner, a volume of fluid flowing through the fluid-pressure motor is restricted, and thus it is possible to prevent the rotary shaft from excessively rotating.

(5) In the rotary inertial mass damper according to (1) above, the piston may be provided with a relief valve.

(6) In the rotary inertial mass damper according to (2) above, the piston may be provided with a relief valve.

(7) In the rotary inertial mass damper according to (3) above, the piston may be provided with a relief valve.

In this case, the piston is provided with the relief valve, thereby making it possible to reduce the generation of a very large burden force in the rotary inertial mass damper. In other words, a fail-safe mechanism is established to be capable of exhibiting stable performance without degradation of the performance due to wear, unlike a friction damper using slipping.

In addition, in a fluid-pressure circuit of the rotary inertial mass damper according to the present invention, the fluid-pressure motor and the damping valve are disposed in series; however, in a vibration model, the inertial mass by the fluid-pressure motor and the damping by the damping valve are disposed in parallel. Further, in the fluid-pressure circuit, the relief valves in the piston are arranged in parallel as described above; however, in the vibration model, arrangement therein is performed in series. As described above, various valves or the like are installed in the fluid-pressure circuit, and thereby it is possible to apply various types of damping, limit characteristics (limiters), or the like to the vibration model.

According to the aspect of the present invention, the rotary inertial mass damper uses the fluid-pressure motor, thereby making it possible to exhibit stable damper performance at low costs from a low speed to high speed without using expensive ball screws or bearings.

DETAILED DESCRIPTION OF THE INVENTION

Hereinafter, a rotary inertial mass damper according to an embodiment of the present invention will be described with reference to the figures.

Figure 1:
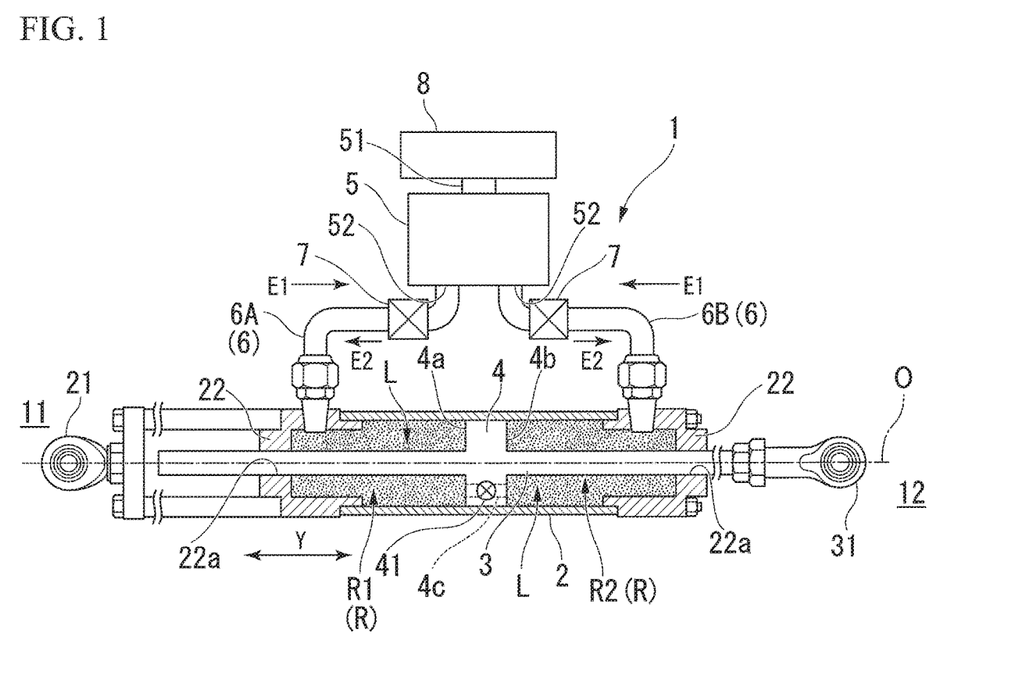
FIG. 1 is a side view showing a partial sectional view of a configuration of a rotary inertial mass damper according to an embodiment of the present invention.

As shown in FIG. 1, a rotary inertial mass damper 1 according to the embodiment is configured to is interposed between two members 11 and 12 which are relatively displaced in a direction (referred to as an approaching or separating direction Y), in which the members approach or are separated from each other on a beam or a floor of a building, in a spring, or the like, and to generate a force due to relative acceleration in the approaching or separating direction. Y which is generated between the two members 11 and 12.

The rotary inertial mass damper 1 includes: a cylinder 2 which is connected to a first member 11 of the two members 11 and 12 and in which operating oil L (operating fluid) is sealed; a piston rod 3 which is connected to the other second member 12 and a part of which is accommodated in the cylinder 2 in a freely reciprocating (sliding) manner in an axial direction of the cylinder; a piston 4 which is provided at an intermediate portion of the piston rod 3 in a direction along a piston axis O and partitions the cylinder 2 into two oil chambers R (a first oil chamber R1 and a second oil chamber R2) (fluid chambers); an oil-pressure motor 5 (fluid-pressure motor) which has a rotary shaft 51 connected to each of the first oil chamber R1 and the second oil chamber R2 via connection pipes 6 (6A and 6B); a damping valve 7 provided in each of the connection pipes 6; and a rotary weight 8 which is integrally provided on the rotary shaft 51 of the oil-pressure motor 5.

The cylinder 2 is a sealed housing having a hollow cylindrical shape, and is provided with a first annular connection ring (clevis) 21 at an end portion closer to the first member 11. End plates 22 and 22 of the cylinder 2 on both sides in the axial direction thereof are provided with respective insertion holes 22a into which the piston rod 3 is slidably inserted in a fluid-tight manner in the direction along the piston axis O. In addition, one end of the connection pipe 6 is connected to each of circumferential surfaces closer to both end plates 22 and 22 of the cylinder 2. A pair of connection pipes 6A and 6B communicate with one of the oil chambers R1 and R2.

The piston rod 3 is slidably inserted into the pair of insertion holes 22a formed in both ends of the cylinder 2, and is provided with a second annular connection ring (clevis) 31 at an end portion that projects from the end plate 22 closer to the second member 12 of the cylinder 2.

The piston 4 has a circular cylindrical shape, is integrally provided to be coaxial to the piston rod 3, and is freely movable in the approaching or separating direction Y. An outer peripheral edge of the piston 4 outward in a radial direction thereof comes into liquid-tight contact with an inner surface of the cylinder 2 via a packing or the like. In other words, the inside of the cylinder 2 is partitioned by the piston 4 into the first oil chamber R1 closer to the first member 11 and the second oil chamber R2 closer to the second member 12.

The piston 4 is provided with a communication passage 4c through which a first end surface 4a that is in contact with the first oil chamber R1 is connected to a second end surface 4b that is in contact with the second oil chamber R2 and through which the first oil chamber R1 communicates with the second oil chamber R2, and a relief valve 41 is provided at a position on the communication passage 4c.

The rotary shaft 51 of the oil-pressure motor 5 rotates due to the oil pressure of the operating oil L that is extruded from one of the first oil chamber R1 and the second oil chamber R2 through reciprocating movement of the piston rod 3. At this time, viscosity resistance is produced in the operating oil L that circulates through the connection pipe 6 by the damping valve 7.

The rotary weight 8 having a substantial disk shape is integrally provided to be coaxial with the rotary shaft 51 of the oil-pressure motor 5, and the rotary weight 8 is capable of rotating along with the rotary shaft 51.

Figure 2:
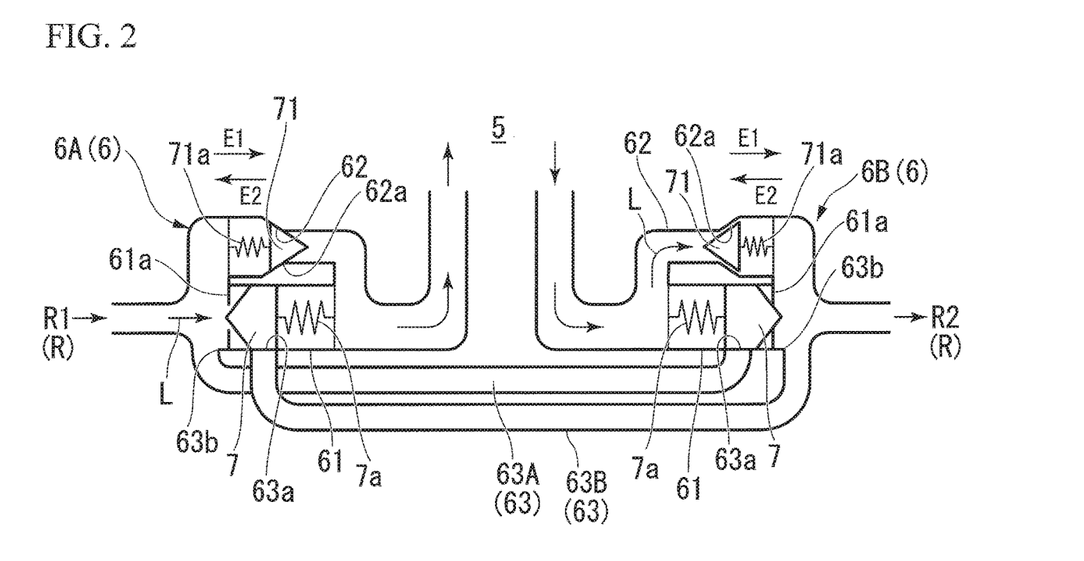
FIG. 2 is a diagram schematically showing a connection pipe shown in FIG. 1.

As shown in FIG. 2, the connection pipes 6A and 6B are provided with a damping channel 61 which is provided with the damping valve 7 and causes the operating oil L in the oil chamber R to flow into the oil-pressure motor 5 and a return channel 62 which is disposed to be parallel to the damping channel 61 and through which the operating oil L flows only in a direction (hereinafter, referred to as a return direction. E2) from the oil-pressure motor 5 to the oil chambers R. The return channel 62 is provided with a check valve 71 that is biased in a direction (hereinafter, referred to as a forward direction E1) from the oil chambers R to the oil-pressure motor 5, and opens and closes the return channel 62.

Note that, in FIG. 2 (also similar in FIGS. 4 and 5 which will be described below), an arrow in the channels (the connection pipes 6A and 6B) represents a circulation direction of the operating oil L.

As shown in FIG. 2, the damping valve 7 is configured to be provided in the damping channel 61, to be biased by a bias force of a damping spring 7a in the return direction E2, and to open and close the damping channel 61. Specifically, the damping channel 61 is provided with a first valve seat 61a and the damping valve 7 is provided to be capable of coming into fluid-tight contact with and being separated from the first valve seat 61a in a state of being biased from the oil-pressure motor 5. Note that the damping spring 7a is set to have appropriate spring stiffness so as to open the damping valve 7 with the operating oil L that flows in the damping channel 61 in the forward direction E1.

In other words, the damping valve 7 is opened when the operating oil L in the oil chambers R flows in the forward direction E1, and is closed when the operating oil flows in the return direction E2. When the operating oil L flowing through the damping channel 61 is caused to flow into the oil-pressure motor 5, the rotary shaft 51 rotates in a predetermined rotating direction. Note that the rotating direction of the rotary shaft 51 means forward and reverse rotation of the oil pressure motor 5 by the operating oil L that passes through a first connection pipe 6A that is connected to the first oil chamber R1 and a second connection pipe 6B that is connected to the second oil chamber R2.

The check valve 71 is configured to be biased by a bias force of a spring 71a for the check valve in the forward direction E1 and to open and close the return channel 62. The return channel 62 is provided with a second valve seat 62a and the cheek valve 71 is provided to be capable of coming into fluid-tight contact with and being separated from the second valve seat 62a in a state of being biased from the oil chambers R side. The check valve 71 is opened when the operating oil L flows in the forward direction E1, and is closed when the operating oil flows in the return direction E2.

In addition, the connection pipes 6A and 6B has bypass pipes 63A and 63B that connect the respective damping channels 61 and the other connection pipe 6. When the damping valve 7 is opened to a degree larger than a predetermined degree against to the bias force of the damping spring 7a, first connection ports 63a that open on the damping channels 61 side of the bypass pipes 63A and 63B are disposed at positions at which the damping channels 61 communicate with the bypass pipes 63A and 63B. In addition, a second connection port 63b on a side opposite to the first connection port 63a is connected to a position of the other connection pipe 6 (second connection pipe 6B in FIG. 2) which is closer to the oil chambers R from the damping valve 7.

Therefore, in such a configuration, when the first connection port 63a is opened, a part of the operating oil L flowing in the forward direction E1 circulates through the bypass pipes 63A and 63B, flows to the other connection pipe 6 side, and is sent into the oil chamber R that communicates with the other connection pipe 6.

As shown in FIG. 1, in the rotary inertial mass damper 1 having the configuration, when the two members 11 and 12 described above approach and are separated from each other, the piston rod 3 that is fixed to the other second member 12 performs the linear motion in the approaching or separating direction Y (direction along the piston axis O) with respect to the cylinder 2 that is fixed to the first member 11, and the operating oil L flows depending on volumes of the oil chambers R1 and R2, which are changed by the piston 4, into the oil-pressure motor 5 that is driven to rotate by the operating oil. In a configuration in which the rotary shaft 51 is caused to rotate and thereby the rotary motion is performed, the linear motion of the piston rod 3 is converted into the rotary motion of the rotary shaft 51.

Next, the rotary inertial mass damper 1 having the configuration described above will be further described with reference to FIG. 1 or the like.

When x represents damper displacement (displacement of the piston rod 3 and the piston 4 in a direction along the piston axis O), an oil volume $V_O$ (cm³) of the operating oil L that is supplied to the oil-pressure motor 5 through the connection pipe 6 is obtained from $V_O = A \cdot x$ when A (cm²) represents an internal cross section of the cylinder 2. Therefore, the relief valve 41 is provided in the piston 4 that is provided in the piston rod 3, and thereby a fail-safe mechanism that does not generate an excessive load reactive force is established.

As described above, the rotary inertial mass damper 1 of the embodiment has a configuration in which the damping valve 7 is provided at a position on the connection pipe 6, the rotary weight 8 is joined to the rotary shaft 51 of the oil-pressure motor 5, and thereby the damping occurs in proportion to the speed or the operating oil L flowing through the connection pipes 6.

Here, as the oil-pressure motor 5, a piston type oil-pressure motor that configured to cope with high torque in a compact size in that the entire operating oil L enters the motor cylinder, good rotation followability is achieved during an operation at a low speed, and it is possible to operate at high oil pressure.

When V cm³ represents an oil volume (pushed volume) required for rotation of the oil-pressure motor 5 by 360 degrees, T (N·m) represents rated output torque, n (the number of rotations per one minute: rpm) represents a rated number of rotations, p (MPa) represents rated pressure of the operating oil, and A cm² represents an internal cross-sectional area of the cylinder 2, Expression (1) expressing a damper burden force F (kN) is obtained.

In addition, damper displacement $x_1$ obtained when the oil-pressure motor 5 rotates by 360 degrees is obtained from Expression (2).

$$F = \frac{pA}{10} \qquad \text{Expression (1)}$$

$$V = Ax_1 \qquad \text{Expression (2)}$$

$$x_1 = \frac{V}{A}$$

This corresponds to a lead dimension $L_d$ of a ball screw in the rotary inertial mass damper using a type of ball screw in the related art ($L_d = x_1$).

In addition, a damper speed $\dot{x}_{max}$ (cm/s) obtained at the time of the rated number of rotations (value per 60 seconds) is expressed by Expression (3).

$$\dot{x}_{max} = \frac{n}{60} \times \frac{V}{A} = \frac{nx_1}{60} \qquad \text{Expression (3)}$$

Inertial mass ψ obtained in a case where the rotary weight 8 having rotary inertial moment of $I_\theta$ (ton·cm²) is mounted on the rotary shaft 51 of the oil-pressure motor 5 is expressed by Expression (4).

$$\psi = \left(\frac{2\pi}{x_1}\right)^2 \times I_\theta = \left(\frac{2\pi A}{V}\right)^2 \times I_\theta \qquad \text{Expression (4)}$$

In this manner, a mechanism that generates a burden force $F_\psi = \psi \cdot \ddot{x}$ (... above x) proportional to moving acceleration $\ddot{x}$ (... above x) (=relative acceleration at both ends of the damper) of the piston rod 3 is achieved.

Next, the connection pipes 6 and the damping valve 7 described above will be described in detail with reference to FIGS. 1, 2, or the like.

In the rotary inertial mass damper 1 of the embodiment, since the damping valve 7 has characteristics depending on the reciprocating movement of the piston rod 3, the check valve 71 that causes the operating oil L to pass only in the return direction E2 and the damping valve 7 that generates the viscosity resistance proportional to the speed are used as a set, and the valves are provided in both ports (connection port 52) of the oil-pressure motor 5. In this manner, a mechanism that generates a damping force $F_c = c \cdot \dot{x}$ (c is a damping coefficient) proportional to the moving speed $\dot{x}$ (damper speed) of the piston rod 3 is achieved.

Figure 3:
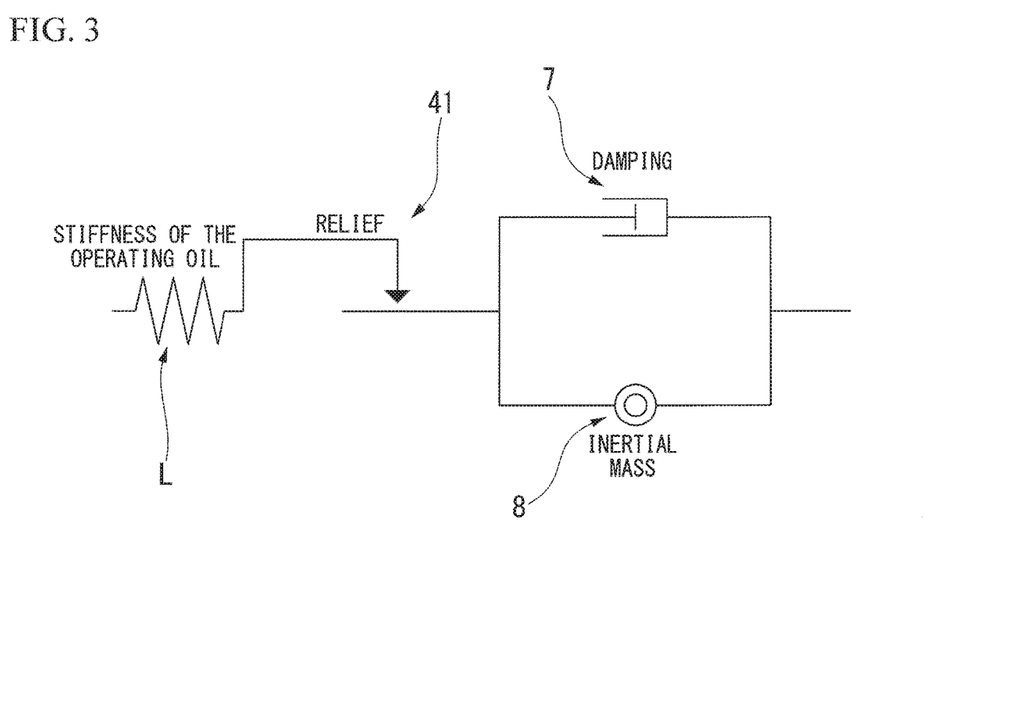
FIG. 3 is a diagram showing a vibration model of the rotary inertial mass damper shown in FIG. 1.

Since the damping valve 7 and the oil-pressure motor 5 are disposed in series in an oil-pressure circuit, the damper burden force (reaction force) F is a sum of $F_\psi$ (proportional to the relative acceleration) obtained with the inertial mass ψ of the rotary weight 8 and Fc (proportional to the relative speed) obtained with the damping coefficient c, and an example in which the inertial mass and the damping are parallel is employed as a vibration model shown in FIG. 3. Note that both of a friction factor that limits the burden force by the relief valve 41 provided on the piston rod 3 in FIG. 3 and a spring element, by which stiffness of the operating oil L is evaluated, are shown.

In addition, in a case where the damper speed $\dot{x}$ is higher than $\dot{x}_{max}$ that reaches the rated number of rotations of the oil-pressure motor 5, a configuration of limiting the oil volume of the operating oil L that flows through the bypass pipe 63 into the oil-pressure motor 5 is added.

In this manner, it is possible to reduce the occurrence in which the oil-pressure motor 5 exceeds the rated number of rotations, and to prevent a sliding portion from being subjected to galling. Thus, it is possible to reduce an increase in the number of rotations even when excessive input is performed.

Figure 4:
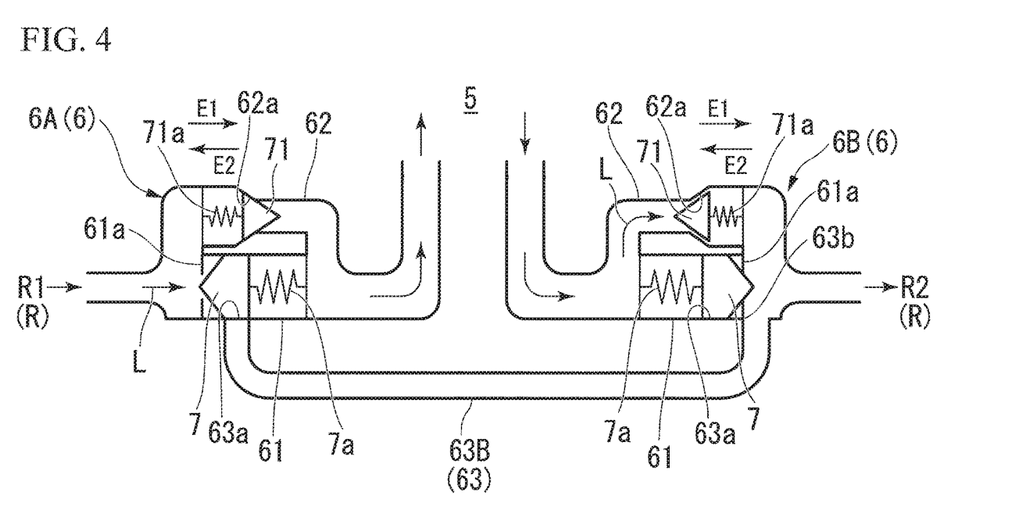
FIG. 4 is a diagram that corresponds to FIG. 2 showing a part of the rotary inertial mass damper and shows flow of operating oil by a damping valve at normal times.

Here, a case where the operating oil L of the first oil chamber R1 flows in the forward direction E1 in the first connection pipe 6A is described. Note that FIGS. 4 and 5 are diagrams corresponding to FIG. 2, and one bypass pipe 63A is omitted for convenience of description. In a case where the damper speed has a relationship of $\dot{x} \leq \dot{x}_{max}$ (during a normal operation), as shown in FIG. 4, the operating oil L causes the damping valve 7 of the damping channel 61 of the first connection pipe 6A to be opened so as to pass through the damping valve and flows into the oil-pressure motor 5. At this time, the check valve 71 of the return channel 62 enters an opened state. The operating oil L flowing into the oil-pressure motor 5 causes the check valve 71 of the return channel 62 of the second connection pipe 6B to be opened so as to pass through the check valve and returns to the second oil chamber R2 of the cylinder 2. At this time, the operating oil L does not flow into the bypass pipe 63B.

Figure 5:
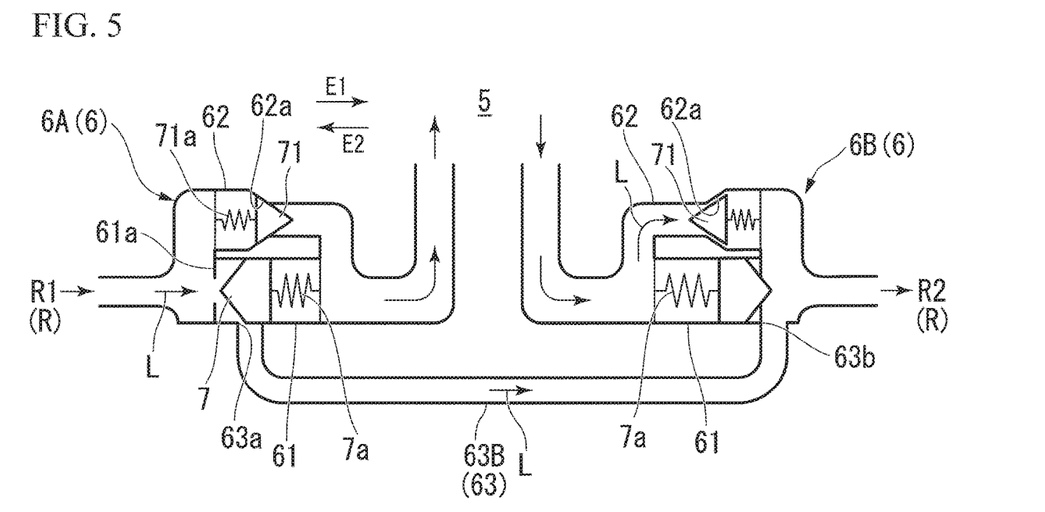
FIG. 5 is a diagram that corresponds to FIG. 2 showing a part of the rotary inertial mass damper and shows flow of the operating oil by the damping valve at a time of excessive input.

On the other hand, in a case where the damper speed has a relationship of $\dot{x} > \dot{x}_{max}$ (at the time of excessive input), as shown in FIG. 5, the damping force Fc increases due to an increase in $\dot{x}$, the damping spring 7a of the damping valve 7 is compressed, and the first connection port 63a of the bypass pipe 63B is opened. Therefore, the operating oil L flows to the bypass pipe 63B, and the oil volume in the oil-pressure motor 5 is limited. Note that such a configuration has the fail-safe mechanism with respect to the number of rotations of the oil-pressure motor 5, and is different from a relief mechanism provided on the piston rod 3 in the cylinder 2 with an aim of limiting the damper reaction force.

Next, operations of the rotary inertial mass damper 1 described above will be described with reference to the figures.

As shown in FIG. 1, in the embodiment, when the relative vibration is generated between the first member 11 and the second member 12 in the approaching or separating; direction Y, and the piston rod 3 performs the reciprocating movement in the cylinder 2 in the direction along the piston axis O, the operating oil L flows into the connection pipes 6 (6A and 6B) that connect the oil chambers R1 and R2 in the cylinder 2 and the oil-pressure motor 5 such that the rotary shaft 51 of the oil-pressure motor 5 rotates. In this manner, the rotary weight 8 rotates around the rotary shaft 51, and the inertial mass is applied by the rotary weight 8. At this time, since the damping valve 7 is provided at a position on the connection pipe 6, and the viscosity resistance is produced in the operating oil L that passes through the damping valve 7, it is possible to produce damping proportional to a displacement amount of the piston 4 in the direction along the piston axis by the damping valve 7, that is, the speed of the operating oil L that flows through the connection pipe 6.

As described above, in the embodiment, the oil-pressure motor 5 and a configuration corresponding to an oil damper in the related art that includes the cylinder and the piston 4 are combined, and thereby it is possible to configure the rotary inertial mass damper 1. Therefore, there is no need to provide the expensive ball screws or bearings, and thus it is possible to achieve a reduction in cost.

In addition, in the embodiment, as shown in FIG. 2, the damping valve 7 is provided at a position on the connection pipe 6 that connects the oil chambers R1 and R2 of the cylinder 2 and the oil-pressure motor 5, thereby making it possible to apply the damping in parallel with the inertial mass in the vibration model shown FIG. 3. Therefore, the adjustment of the damping valve 7 enables an arbitrary damping coefficient to be applied, and it is possible to apply the optimal effective damping to response reduction.

In addition, in the rotary inertial mass damper 1 of the embodiment, since the frame rigidity is obtained, similar to a common oil damper, any portions that configure the rotary inertial mass damper can return to original positions after an earthquake. Therefore, also in a case where a plurality of earthquakes such as aftershocks following a major earthquake occur, it is possible to maintain initial performance without a drift of the piston 4 in the rotary inertial mass damper 1 in a specific direction.

Hence, it is possible to employ a configuration that can stably exhibit damper performance without a reduction in stroke of the ball screw due to residual deformation, compared to a damper in the related art that uses a ball screw.

In addition, in the rotary inertial mass damper 1 of the embodiment, in a case where the operating oil L passes through the connection pipe 6 at an excessive speed equal to or higher than a certain speed, the damping valve 7 is largely opened, and thereby it is possible for a part of the operating oil L to flow into the bypass pipe 63. In this manner, the volume of the oil flowing through the oil-pressure motor 5 is restricted, and thus it is possible to prevent the rotary shaft 51 from excessively rotating.

In addition, in the embodiment, the piston 4 is provided with the relief valve 41, thereby making it possible to reduce the generation of a very large burden force in the rotary inertial mass damper 1. In other words, a fail-safe mechanism that is capable of exhibiting the stable performance without degradation of the performance due to wear, unlike a friction damper using slipping.

In addition, in an oil-pressure circuit of the rotary inertial mass damper 1 of the embodiment, the oil-pressure motor 5 and the damping valve 7 are disposed in series; however, in the vibration model, the inertial mass by the oil-pressure motor 5 and the damping by the damping valve 7 are disposed in parallel. Further, in the oil-pressure circuit, the relief valves 41 in the piston rod 3 are arranged in parallel; however, in the vibration model, arrangement is performed in series. As described above, various valves or the like are installed in the oil-pressure circuit, thereby making it possible to apply various types of damping, limit characteristics (limiters), or the like to the vibration model.

As described above, in the rotary inertial mass damper according to the embodiment, the oil-pressure motor 5 is used, thereby making it possible to exhibit stable damper performance at low costs from a low speed to a high speed without using expensive ball screws or bearings.

Next, a calculation example of calculating specific numerical values of the rotary inertial mass damper according to the embodiment will be described.

In the calculation example, the rotary inertial mass damper 1 shown in FIGS. 1 to 3 is employed, and a linear range obtained before the bypass pipes 63A and 63B and the relief valve 41 operate is a target.

A vibration attenuating oil damper of 1500 kN is used as the cylinder and the piston which are joined to a structure in a frame, and pressure of the operating oil of the oil-pressure motor and the oil damper is 30 MPa. Here, an outer diameter dimension D1 of the cylinder is 310 mm, and an internal sectional area A is set to 460 cm$^2$.

As the oil-pressure motor, M3X800 (mass of 133 kg) manufactured by Kawasaki Heavy Industries, Ltd is used. In addition, a pushed volume V is 800 cm$^3$/rev, and rotation of 360 degrees is performed when x1=V/A=1.74 cm. In other words, the lead $L_d$ corresponds to the ball screw of 17.4 mm. The damper burden force (reaction force) is 1380 kN from F=30 A/10.

The rated number of rotations n is 1200 rpm, and a damper axial speed is that $nx_1/60$=34.8 cm/s=34.8 kine. With the maximum speed of 34.8 kine and axial stress of 1380 kN, the device is equivalent to the ball screw mechanism having the lead of 17.4.

In a case where the rotary weight is provided to have a diameter of 500 mm, a thickness dimension of 400 mm, mass m of 0.62 ton, and rotary inertial moment $I_\theta$ of 193 ton·cm$^2$, the inertial mass ψ is obtained to be 2516 ton (4058 times actual mass) from Expression (4).

In this manner, it is possible to realize the rotary inertial mass damper having the burden force of 1380 kN and the inertial mass of 2500 ton.

In this case, since it is possible for the damper speed to correspond to 34.8 kine, the damper has sufficient performance as a common damping device.

As described above, the embodiment of the rotary inertial mass damper according to the present invention is described; however, the present invention is not limited to the embodiment described above, and it is possible to perform appropriate modifications in a range without departing from the gist of the present invention.

For example, the embodiment employs a configuration in which the relief valve 41 is provided in the piston 4; however, it is possible to omit the relief valve 41.

In addition, the invention is not limited to the configuration including the bypass pipes 63A and 63B of the embodiment. It is possible to omit the bypass pipes 63A and 63B, and thus the entire operating oil L passing through the damping channel 61 in the forward direction E1 may flow into the oil-pressure motor 5.

In addition, in the embodiment, a valve structure that comes into contact with the first valve seat 61a of the damping channel 61 due to the bias force of the damping spring 7a is employed as the damping valve 7; however, the invention is not limited thereto, and it is possible to employ a valve structure having another configuration. Note that the same is true of a structure of the check valve 71.

Further, a configuration in which one damping valve 7 is provided in the damping channel 61 of the connection pipe 6 is employed; however, a plurality of damping valves can be disposed such that it is possible to adjust the damping coefficient of the entire damping channel 61.

In addition, a radial type motor in which other pistons are radially disposed or an inclined axis type motor in which the piston axis and an output axis are disposed at an angle therebetween may be employed as the piston type oil-pressure motor employed in the embodiment.

Further, a configuration of shapes, dimensions, or the like of the cylinder 2, the piston rod 3, and the piston 4 can be appropriately set depending on conditions such as the damper burden force or an installation position.

In addition, there is no particular limitation on a configuration of a length dimension, a connection position of the connection pipes 6A and 6B to the cylinder 2, positions of the damping channel 61, the return channel 62 in the connection pipe, or the like, and the configuration can also be appropriately set.

In addition, there is no particular limitation on a configuration of a shape, a size, or a material of the rotary weight 8, as long as the rotary weight is joined to the rotary shaft 51 of the oil-pressure motor 5.

In addition, other joining means of a ball joint or the like may be used as the connection member of both ends of the damper instead of a connection ring (clevis).

Otherwise, it is appropriately possible to replace a configurational component in the embodiment described with a known configurational component in a range without departing from the gist of the present invention.

According to the rotary inertial mass damper of the present invention, the oil-pressure motor is used, thereby making it possible to exhibit stable damper performance at low costs from a low speed to a high speed without using expensive ball screws or bearings.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A rotary inertial mass damper that is interposed between two members which are relatively displaced in a direction in which the members approach or are separated from each other, wherein the members generate a force due to relative acceleration in an approaching or separating direction which is generated between the two members, the damper comprising:
  a cylinder which is connected to one of the two members and in which an operating fluid is sealed;
  a piston rod which is connected to the other of the two members and a part of which is accommodated in the cylinder in a freely reciprocating manner;
  a piston which is provided with the piston rod and partitions the cylinder into two fluid chambers;
  a fluid-pressure motor which has a rotary shaft and is in fluid communication with each of the two fluid chambers via a plurality of connection pipes;
  a rotary weight which is integrally provided on the rotary shaft of the fluid-pressure motor; and
  a damping valve biased by a damping spring, the damping valve exhibits a damping force by an operating fluid and applies the damping force in parallel with an inertial mass of the rotary weight,
  wherein the rotary shaft of the fluid-pressure motor rotates due to fluid pressure of an operating fluid that is extruded from one of the fluid chambers through reciprocating movement of the piston rod via connection pipes,
  the fluid-pressure motor is disposed outside the piston and the cylinder, the damping valve is provided in the middle of a pipe system connecting the fluid-pressure motor and the cylinder, and the fluid-pressure motor is configured to exhibit the damping force $Fc=c \cdot x$, c being a damping coefficient, the damping force being in proportion to the moving speed x of the piston rod,
  and wherein the rotary weight mounted on the rotary shaft of the fluid-pressure motor has an inertial mass $\Psi$, with a rotary inertial moment of $I_\theta$, the inertial mass determined by the equation, $$\psi = \left(\frac{2\pi}{x_1}\right)^2 \times I_0 = \left(\frac{2\pi A}{V}\right)^2 \times I_0$$

and wherein a mechanism that generates a burden force $F_\Psi$ proportional to moving acceleration x of the piston rod is achieved.

2. The rotary inertial mass damper according to claim 1, wherein the damping valve is provided on each of the connection pipes, and wherein the dampening valve produces a viscosity resistance in an operating fluid that circulates through the connection pipe.

3. The rotary inertial mass damper according to claim 1, further comprising: a bypass pipe that connects the connection pipes, wherein, when an operating fluid flows at a first speed equal to or higher than the fluid flowing at a second speed in one of the connection pipes, the operating fluid in the one connection pipe is circulated toward the other connection pipe through the bypass pipe.

4. The rotary inertial mass damper according to claim 2, further comprising: a bypass pipe that connects the connection pipes, wherein, when an operating fluid flows at a first speed equal to or higher than the fluid flowing at a second speed in one of the connection pipes, the operating fluid in the one connection pipe is circulated toward the other connection pipe through the bypass pipe.

5. The rotary inertial mass damper according to claim 1, wherein the piston is provided with a relief valve.

6. The rotary inertial mass damper according to claim 2, wherein the piston is provided with a relief valve.

7. The rotary inertial mass damper according to claim 3, wherein the piston is provided with a relief valve.

* * * * *